US012784092B2

(12) United States Patent
Lin et al.

(10) Patent No.: US 12,784,092 B2
(45) Date of Patent: Nov. 3, 2026

(54) CUSTOMIZED PAIRING RECOMMENDATIONS BY MACHINE-LEARNING LANGUAGE LEARNING MODELS

(71) Applicant: Maplebear Inc., San Francisco, CA (US)

(72) Inventors: Shih-Ting Lin, Santa Clara, CA (US); Saurav Manchanda, Seattle, WA (US); Prithvishankar Srinivasan, Seattle, WA (US); Shishir Kumar Prasad, San Ramon, CA (US); Min Xie, Santa Clara, CA (US); Benwen Sun, Mountain View, CA (US); Axel Mange, New York, NY (US); Wenjie Tang, Ontario (CA); Sanchit Gupta, Seattle, WA (US)

(73) Assignee: Maplebear Inc., San Francisco, CA (US)

( * ) Notice: Subject to any disclaimer, the term of this patent is extended or adjusted under 35 U.S.C. 154(b) by 77 days.

(21) Appl. No.: 18/888,607

(22) Filed: Sep. 18, 2024

(65) Prior Publication Data

US 2025/0095046 A1 Mar. 20, 2025

Related U.S. Application Data

(60) Provisional application No. 63/539,089, filed on Sep. 18, 2023.

(51) Int. Cl.

*G06Q 30/00* (2023.01)
*G06Q 10/0833* (2023.01)

(Continued)

(52) U.S. Cl.

CPC ..... *G06Q 30/0631* (2013.01); *G06Q 10/0833* (2013.01); *G06Q 30/0201* (2013.01); *G06Q 30/0633* (2013.01); *G06Q 30/0643* (2013.01)

(58) Field of Classification Search

None

See application file for complete search history.

(56) References Cited

U.S. PATENT DOCUMENTS

| | | | | |
|---|---|---|---|---|
| 10,083,521 | B1 * | 9/2018 | Dhua | G06Q 30/0603 |
| 2013/0339179 | A1 * | 12/2013 | Pickelsimer | G06Q 30/0631 705/26.7 |

(Continued)

OTHER PUBLICATIONS

Restaurant Recommender System Based on Sentiment Analysis; N. Shirisha et al., Jan. 23, 2023.*

*Primary Examiner* — Mila Airapetian

(74) *Attorney, Agent, or Firm* — Fenwick & West LLP

(57) ABSTRACT

An online system obtains a target food from an order for a user and alcohol preferences from an order purchase history. The online system generates a prompt for a machine learning model to request alcohol candidates based on the target food category. The prompt includes the alcohol preferences, and requests for each alcohol candidate, a pairing score indicating how well the target food category pairs with the alcohol candidate and a user preference score indicating how well the alcohol candidate aligns with the alcohol preferences. The online system receives as output the candidate alcohol items. Each alcohol candidate has the pairing score, the user preference score, and a textual reason for scores. The online system matches at least one alcohol item from a catalog with each alcohol candidate. A subset of alcohol items is presented to the user as a carousel.

13 Claims, 7 Drawing Sheets

(51) Int. Cl.
*G06Q 30/0201* (2023.01)
*G06Q 30/0601* (2023.01)

(56) References Cited

U.S. PATENT DOCUMENTS

2017/0103447 A1* 4/2017 Brandenberg ..... G06Q 30/0631
2024/0029134 A1* 1/2024 Rembert ............ G06Q 30/0283
2024/0078572 A1* 3/2024 Saad .................. G06Q 30/0222

* cited by examiner

Item Detail page

CUSTOMIZED PAIRING RECOMMENDATIONS BY MACHINE-LEARNING LANGUAGE LEARNING MODELS

CROSS-REFERENCE TO RELATED APPLICATIONS

This application claims the benefit of U.S. Provisional Application No. 63/539,089, filed on Sep. 18, 2023, which is incorporated by reference herein in its entirety.

BACKGROUND

An online system receives orders from a user for a retailer and fulfills the user's order by coordinating with a picker to pick up the items in the order. For a user buying groceries, for example, it would be advantageous to suggest potential alcohol pairings that pair well with the food as the user is submitting the order via an interface of the online system. However, different users prefer different alcohol pairings, and it is difficult to determine which users prefer which alcohol pairings with the food in their order, which results in inaccurate pairings for the user as well.

SUMMARY

In some aspects, the techniques described herein relate to a method including obtaining an anchor item that a user of an online system interacted with, mapping the anchor item to an anchor category describing a category the anchor item is assigned to, generating a prompt for a machine learning language model. The prompt may specify a request for a set of alcohol categories based on the anchor category and for each alcohol category, a respective pairing score indicating a degree of relevance between the anchor category and the alcohol category and a reasoning for the pairing of the alcohol category. The method further includes receiving, as an output from the machine learning language model, the set of candidate alcohol categories and the pairing score for each alcohol category and the reasoning for the alcohol category, obtaining one or more alcohol items from a catalog database assigned to one or more alcohol categories in the set of alcohol categories, selecting a subset of the one or more alcohol items, and providing the subset of alcohol items to a client device of the user to cause presentation of the subset of alcohol items on a page generated on the client device.

DETAILED DESCRIPTION

Figure 1A:
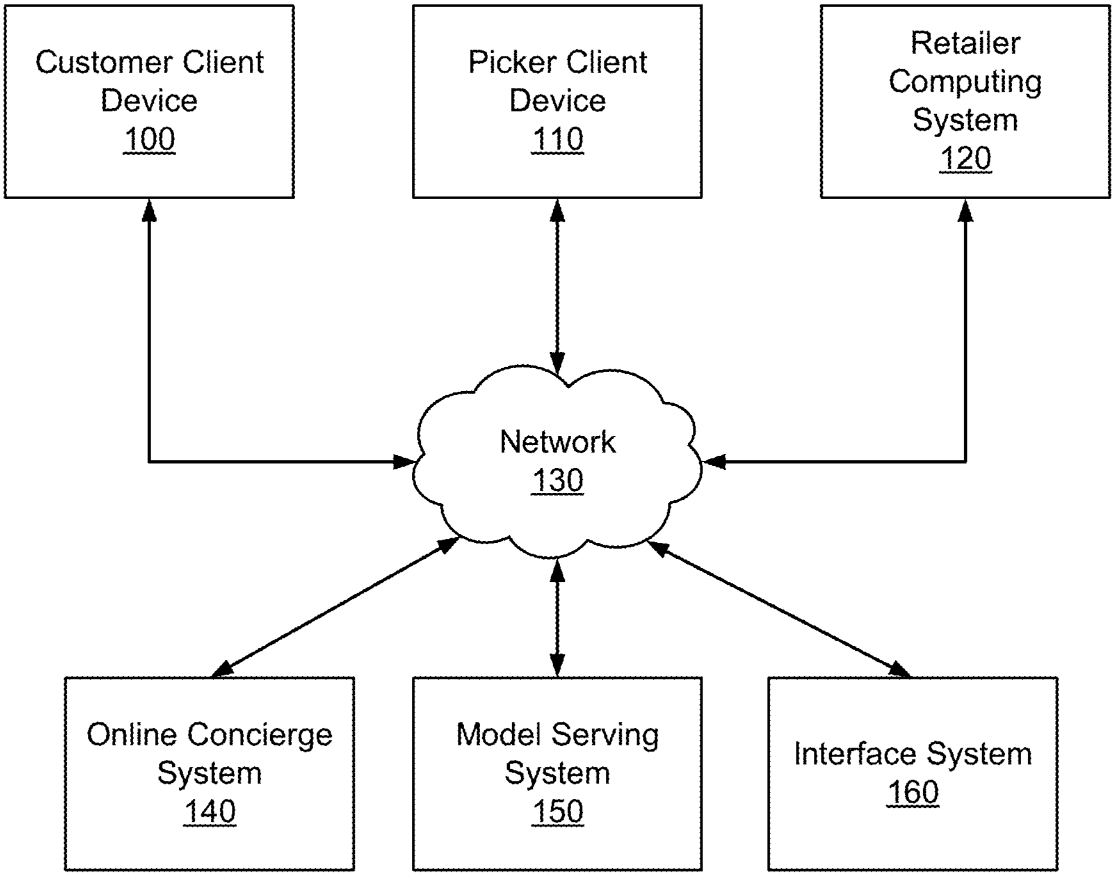
FIG. 1A illustrates an example system environment for an online system, in accordance with some embodiments.

FIG. 1A illustrates an example system environment for an online concierge system 140, in accordance with some embodiments. The system environment illustrated in FIG. 1A includes a customer client device 100, a picker client device 110, a retailer computing system 120, a network 130, and an online system 140. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online system 140. Additionally, while one customer client device 100, picker client device 110, and retailer computing system 120 are illustrated in FIG. 1, any number of customers, pickers, and retailers may interact with the online system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online system 140. The ordering interface may be part of a client application operating on the customer client device 100. The ordering interface allows the customer to search for items that are available through the online system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online concierge system 140 may transmit the location data to the customer client device 100 for display to the customer such that the customer can keep track of when their order will be delivered. Additionally, the online system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In some embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 provides item data indicating which items are available at a retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a user's order (e.g., as a commission).

The customer client device 100, the picker client device 110, the retailer computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which customers can order items to be provided to them by a picker from a retailer. The online system 140 receives orders from a customer client device 100 through the network 130. The online system 140 selects a picker to service the customer's order and transmits the order to a picker client device 110 associated with the picker. The picker collects the ordered items from a retailer location and delivers ordered items to the customer. The online system 140 may charge a customer for the order and provides portions of the payment from the customer to the picker and the retailer.

As an example, the online system 140 may allow a customer to order groceries from a grocery store retailer. The customer's order may specify which groceries they want delivered from the grocery store and the quantities of each of the groceries. The customer's client device 100 transmits the customer's order to the online system 140 and the online system 140 selects a picker to travel to the grocery store retailer location to collect the groceries ordered by the customer. Once the picker has collected the groceries ordered by the customer, the picker delivers the groceries to a location transmitted to the picker client device 110 by the online system 140. The online system 140 is described in further detail below with regards to FIG. 2.

The model serving system 150 receives requests from the online concierge system 140 to perform tasks using machine-learned models. The tasks include, but are not limited to, natural language processing (NLP) tasks, audio processing tasks, image processing tasks, video processing tasks, and the like. In one or more embodiments, the machine-learned models deployed by the model serving system 150 are models configured to perform one or more NLP tasks. The NLP tasks include, but are not limited to, text generation, query processing, machine translation, chatbots, and the like. In one or more embodiments, the language model is configured as a transformer neural network architecture. Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online concierge system 140 or one or more entities different from the online concierge system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In one or more embodiments, the online system 140 personalizes alcohol and food pairing recommendations. Specifically, the online system 140 prepares a prompt for input to the model serving system 150. The online system 140 receives a response to the prompt from the model serving system 150 based on execution of the machine-learned model using the prompt. The online system 140 obtains the response, which includes, for a list of alcohol candidates, a pairing score, a preference score, and a reason for the score, and links each item on the list to an item in the system's catalog. The online system 140 prioritizes and sorts the list of alcohol candidates based on external data and/or further rules/heuristics and then provides the final recommendation to the user. Although the examples and discussions provided herein are focused on alcohol, similar methods may be used for non-alcoholic drink and food pairings without departing from the scope of the disclosure. For example, the drink pairings may include non-alcoholic beers or wines, as well as juices, mixed drinks, sodas, mocktails, etc.

In one or more embodiments, the task for the model serving system 150 is based on knowledge of the online system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one or more embodiments, the online system 140 is connected to an interface system 160. The interface system 160 receives external data from the online system 140 and builds a structured index over the external data using, for example, another machine-learned language model or heuristics. The interface system 160 receives one or more queries from the online system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online system 140 can generate a prompt using the external data as context, the amount of information in the external data may exceed prompt size limitations configured by the machine-learned language model. The interface system 160 can resolve prompt size limitations by generating a structured index of the data and offers data connectors to external data sources.

In one or more embodiments, for an order of a user, the online system 140 performs a query to a machine-learned model for pairing information. Specifically, the online system 140 provides external data relating to the pairing of alcohol and food to the model serving system 150. The online system 140 provides a request to the model serving system 150 to infer alcohol pairings for the order given the list of items and previous user shopping history for the user. The online system 140 receives a response to the prompt from the model serving system 150 based on execution of the machine-learned model. The online system 140 obtains the response and includes the external pairing data in the personalized recommendations for alcohol pairings to the user. In some embodiments, the online system 140 uses the external pairing data to sort the list of potential alcohol candidates into a final recommendation.

Figure 1B:
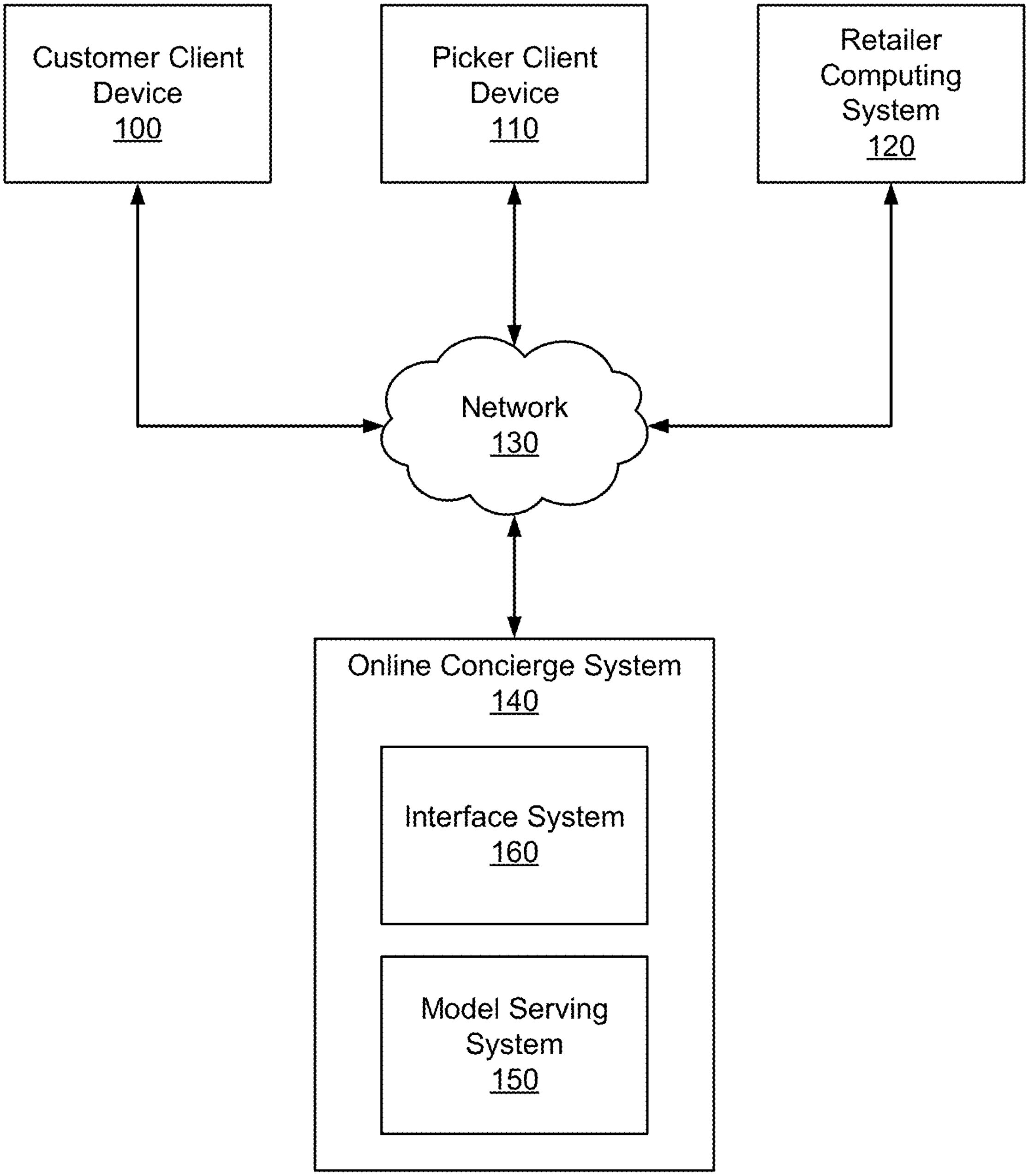
FIG. 1B illustrates an example system environment for an online system, in accordance with some embodiments.

FIG. 1B illustrates an example system environment for an online concierge system 140, in accordance with some embodiments. The system environment illustrated in FIG. 1B includes a customer client device 100, a picker client device 110, a retailer computing system 120, a network 130, and an online concierge system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online concierge system 140. In one or more embodiments, as illustrated in the example system environment in FIG. 1B, the model serving system 150 and/or the interface system 160 is managed and deployed by the entity managing the online system 140.

Figure 2:
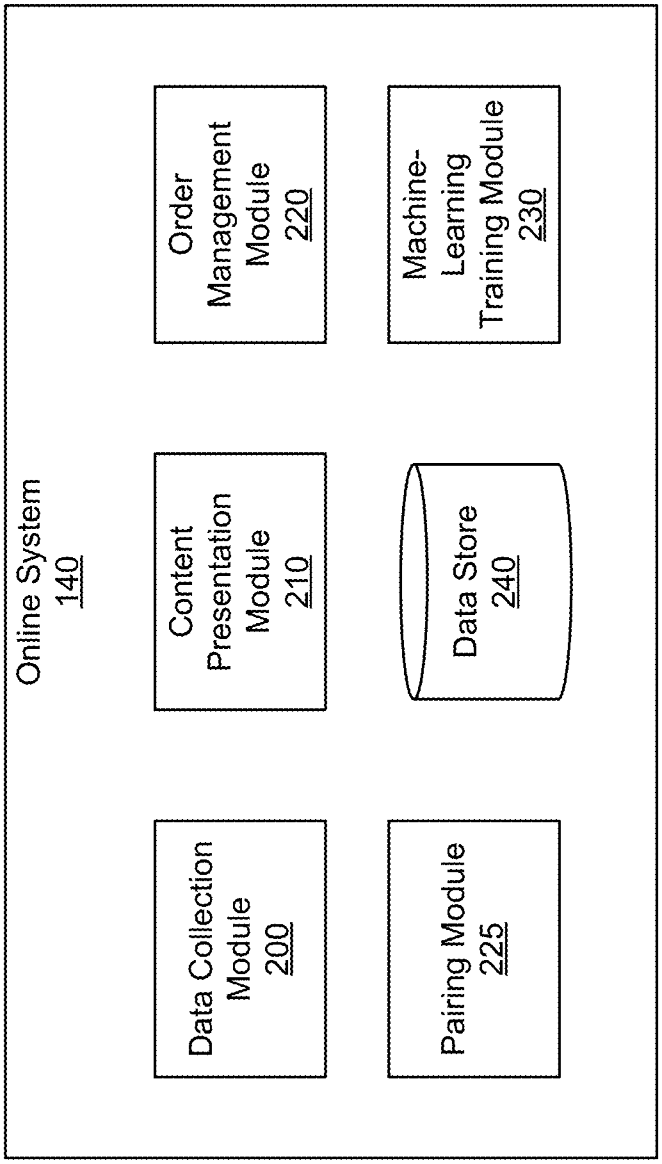
FIG. 2 illustrates an example system architecture for an online system, in accordance with some embodiments.

FIG. 2 illustrates an example system architecture for an online concierge system 140, in accordance with some embodiments. The system architecture illustrated in FIG. 2 includes a data collection module 200, a content presentation module 210, an order management module 220, a pairing module 225, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. As an example, the picker data for a picker may include the picker's name, the picker's location, how often the picker has services orders for the online system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores the items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

Generating Alcohol Pairing Recommendations for an Order Using LLM's

The pairing module 225 personalizes the alcohol and item pairing recommendation for the user based on the user's order purchase history. In one or more embodiments, the pairing module 225 recommends alcohol based on food items in a user's order. In another embodiment, the food-alcohol pairing module 225 recommends food based on alcohol items.

The pairing module 225 obtains a category of an anchor item which can be a food item based on the food items in the user's order. As an example, the user's shopping list may include an item which falls into the food item category "cheese," and another item which falls into the food item category "crackers." If the user has oysters on their shopping list, a target food item category may be "Food>Seafood>Shellfish>Oysters." The pairing module 225 obtains alcohol preferences of the user from an order purchase history of the user. For example, the user may have an order history in which all alcohol purchases have been beer. In another instance, the purchase history of the user may be used to infer, by the machine-learned model, preferences of the user for other items that may be useful in inferring candidate alcohol pairings for the user's order.

The pairing module 225 generates a prompt for a machine learning model, in the model serving system 150, to request candidates for the alcohol recommendation based on the items (e.g., food items) on the order list of a user. In one or more embodiments, the prompt further includes the obtained alcohol preferences (e.g., from user purchase history) and request that for each potential alcohol recommendation, the machine learning model provides a pairing score indicating how well the target food item category pairs with the alcohol candidate and a user preference score indicating how well the alcohol candidate aligns with the alcohol preferences of the user. In some embodiments, the pairing module 225 also requests a textual reason explaining each score.

For example, the prompt may recite the following:

"Imagine you need to recommend a personalized list of alcohol that a target customer can buy together with products in a food category. Based on the given customer alcohol preference list, provide up to 5 alcohol that pairs well with the given food category and also aligned with the user's alcohol preference. For each alcohol, also provide a score between 0 and 1 to indicate how well the food in the given category pairs with this alcohol ignoring customer's preference, a score between 0 and 1 to indicate how well the alcohol aligned with the customer's preference ignoring food pairing, and a short reason to explain why you make this recommendation. Return in JSON format as follows."

The requested format may be the following as an example:

```
{
  ALCOHOL_NAME: {
    "pairing_score": floating point, // a score between 0 and 1, indicating how well the given food pairs with this alcohol
    "preference_score": floating point, // a score between 0 and 1, indicating how well the alcohol aligned with the customer's preference
    "reason": string // a short explanation about this alcohol output
  }
}
```

For each (user, food category) pair, the pairing module 225 applies a prompt template with the user's alcohol preference obtained from the user's alcohol order history data, and the target anchor category to obtain the input prompt to LLM. In some embodiments, a few examples can also be included to guide the output. Since the prompt will vary only when the user preference and the target food category change, in one or more embodiments, the pairing module 225 calls the machine learning model per (customer preference, food category) pair.

The pairing module 225 receives the output from the machine learning model as a structured list of personalized alcohol pairing recommendations for a target food category for a customer. For each of the alcohol categories, the output includes the pairing score, the user preference score, and a textual reason for the pairing score and the user preference score. For example, output may include the following:

```
{
  "Stout": {
    "pairing_score": 0.8,
    "preference_score": 0.6,
    "reason": "Stout has a rich and creamy texture that pairs well with the briny and salty flavor of oysters. It also aligns with the customer's preference for beer."
  },
  "Champagne": {
    "pairing_score": 0.9,
    "preference_score": 0.2,
    "reason": "Champagne's acidity and effervescence cut through the richness of oysters, making it a classic pairing. However, it may not align with the customer's preference for beer."
  },
  "Sauvignon Blanc": {
    "pairing_score": 0.7,
    "preference_score": 0.4,
    "reason": "Sauvignon Blanc's bright acidity and herbaceous notes complement the briny flavor of oysters. It also somewhat aligns with the customer's preference for beer."
  },
  "Gin": {
    "pairing_score": 0.6,
    "preference_score": 0.8,
    "reason": "Gin's botanicals and herbal notes pair well with the briny flavor of oysters. It also aligns with the customer's preference for beer."
  },
  "IPA": {
    "pairing_score": 0.5,
    "preference_score": 0.7,
    "reason": "IPA's hoppy bitterness can overpower the delicate flavor of oysters, but it can also complement the brininess. It somewhat aligns with the customer's preference for beer."
  }
}
```

In one or more embodiments, the pairing module 225 may select one or more alcohol categories that have, for example, a pairing score and a preference score each above a threshold, or where a combination (e.g., average) of the pairing score and the preference score is above a threshold. In one instance, the pairing score and the preference score are combined through a weighted average. As an example, a user that purchases beverages more frequently may have specific preferences, and in this case, the weight for the preference score may be higher than a weight for the pairing score. With the set of candidate alcohol items, the pairing module 225 applies an entity-linking process to link the generated alcohol name or category generated by the machine-learned model to the alcohol category in the catalog of the online service 140. The pairing module 225 creates a list of alcohol items that fall under the linked alcohol categories as a final personalized recommendation to use in a product application. The pairing module 225 may also use the alcohol attribute keywords extracted from the machine learning model-generated explanation to get a more relevant list of items.

For example, the alcohol category "Sauvignon Blanc" is a category to link with the generated name "Sauvignon Blanc" from an example output. Instead of adding all items in "Sauvignon Blanc" to the final alcohol recommendation, the pairing module 225 may limit to the Sauvignon Blanc item with the "herbaceous notes" from the explanation provided by the machine-learned model. Alternatively, the pairing module 225 may rank the items in "Sauvignon Blanc" by whether the product has matched alcohol attributes mentioned in the explanation (e.g., Sauvignon Blanc items with the "herbaceous notes" will get ranked higher). In this way, the user can see more recommendations, but with high-relevant products at the top. In yet another embodiment, the pairing module 225 may select a subset of alcohol items that are associated with a threshold score or proportion of the pairing score and/or the preference score generated by the machine-learned model.

The pairing module 225 may also combine the personalized recommendation list of items with recommendations obtained from a rule-based/heuristic-based approach or external data source. For example, the pairing module 225 leverages the engagement data from the online service 140 to obtain and identify the alcohol a user has previously purchased together most with a given food item in previous order, and add this alcohol into the recommendation. The pairing module 225 may also obtain the alcohol pairing for a food item from the Internet or external database and do a similar entity linking algorithm to map the external alcohol recommendation to items from the catalog of online system 140, and include the items to the final recommendation list. For users with no alcohol preferences, the pairing module 225 may infer from the order history data, or rely on the top items in the alcohol category based on the user's geographical location as the recommendation.

The pairing module 225 provides the final recommended list of alcohol items to the content presentation module 210 for presentation and display along with the associated textual reason for the recommendation. In this manner, the machine-learned model (e.g., LLM) can automatically take into account the user's purchase history as well as items in the user's order during the user's shopping experience to generate recommendations for alcohol (or food) pairings, instead of having a human operator manually pick and choose the pairings, which can be a tedious process. Moreover, because the LLM is trained using vast amounts of data and takes into account a holistic view of the user's history and preferences, the resulting pairings may be of higher accuracy and performance compared to manually picking the pairings.

Figure 3:
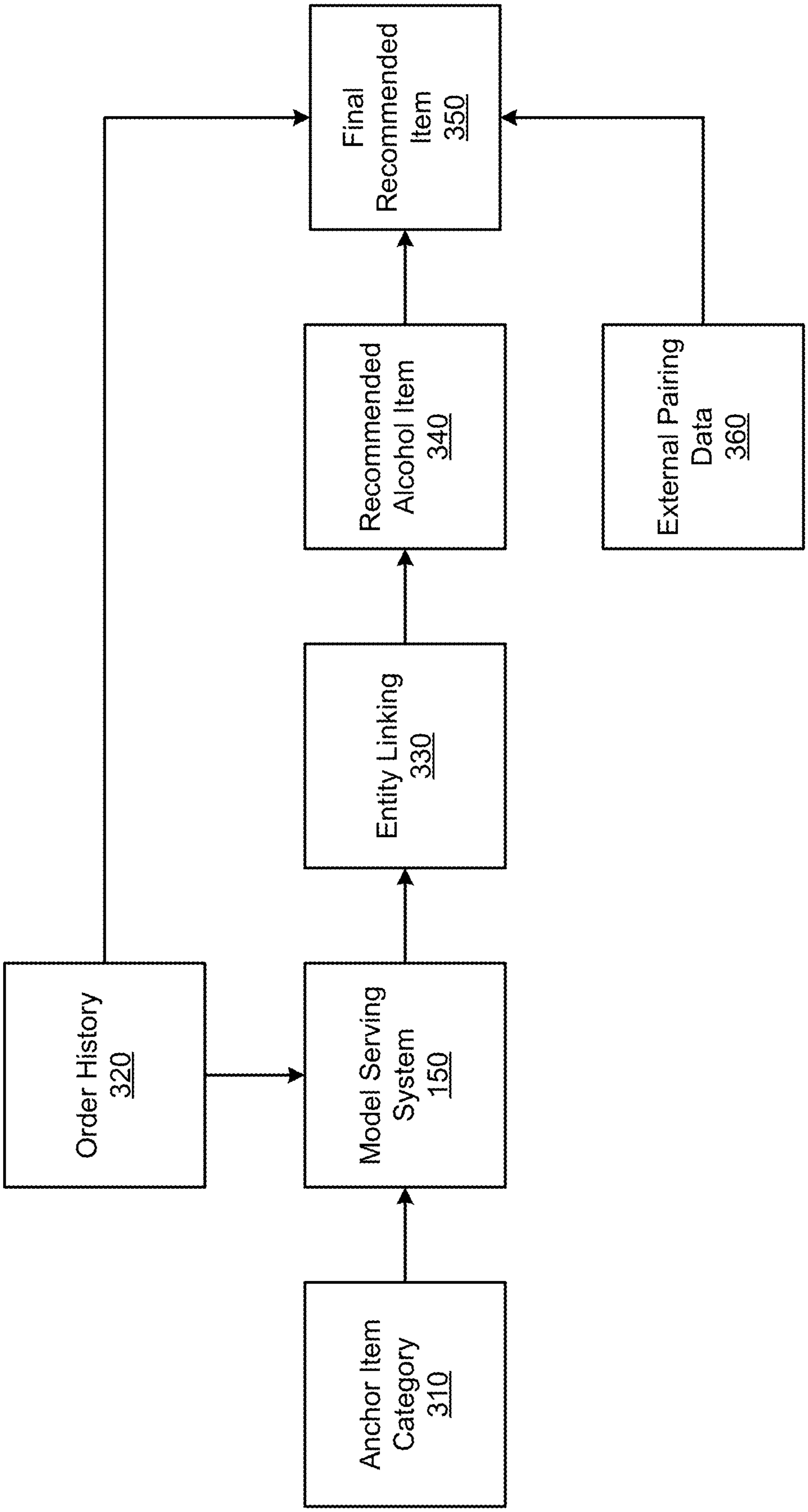
FIG. 3 is a block diagram illustrating an example system for personalizing alcohol recommendations, in accordance with some embodiments.

FIG. 3 is a block diagram illustrating an example process for personalizing alcohol recommendations, in accordance with some embodiments. Alternative embodiments of the process may include more, fewer, or different steps from those illustrated in FIG. 3, and the steps may be performed in a different order from that illustrated in FIG. 3. These steps may be performed by an online system (e.g., online system 140) and related modules (e.g., the pairing module 225). Additionally, each of these steps may be performed automatically by the online system without human intervention.

The pairing module 225 obtains an anchor item category 310 from the user's order list. The pairing module 225 obtains the anchor item category 310 based on the food items in the order list for the user. For example, if the user has oysters on their shopping list, the target food item category 310 may be "Food>Seafood>Shellfish>Oysters." In one or more embodiments, the online system 140 may store and manage a catalog that is organized according to taxonomy of item categories. The online system 140 may obtain an item category that pertains to an item in the user's order.

The pairing module 225 obtains the user's alcohol preferences from the order history 320. As an example, the user may have an order purchase history which indicates a preference for beer over wine or liquor.

The pairing module 225 generates a prompt for a machine learning model deployed in the model serving system 150. The pairing module 225 generates a prompt for the model serving system 150 to request candidates for the alcohol recommendation based on the target food item category 310. The prompt includes the obtained the alcohol preferences from the order history 320 and requests that for each potential alcohol recommendation, the model serving system 150 provide a pairing score indicating how well the anchor item category 310 pairs with the alcohol candidate or alcohol category and a user preference score indicating how well the alcohol candidate aligns with the alcohol preferences of the user based on the order history 320.

For each (user, food category) pair, the pairing module 225 applies a prompt template with the customer's alcohol preference obtained from the shopping history 320 and the anchor item category 310 to get the input prompt to the model serving system 150. In one or more embodiments, a few examples can also be included to guide the output. Since the prompt will vary only when the user preference based on the order history 320 and the anchor item category 310 change, the pairing module 225 actually only needs to call the model serving system 150 per (user preference, food category) pair. For more examples on the generated prompts, see discussion relating to the food-alcohol pairing module 225 in FIG. 2 above.

The pairing module 225 receives the output from the model serving system 150 as a structured list of personalized alcohol pairing recommendations for the anchor item category 310. For each of the alcohol categories, the output includes the pairing score, the user preference score, and a textual reason for the pairing score and the user preference score. For more examples, see discussion relating to the pairing module 225 in FIG. 2 above.

The pairing module 225 performs an entity linking algorithm 330 to link the candidate alcohol categories from the output of the model serving system 150 with items from the catalog of the online system 140. With the set of candidate alcohol names, the pairing module 225 applies an entity-linking algorithm 330 to link the generated alcohol name to the alcohol category in the catalog of the online service 140. In doing so, the entity-linking algorithm 330 creates a list of recommended alcohol items 340 that are in the catalog of the online system 140 based on the output of the model serving system 150. The pairing module 225 may also use the alcohol attribute keywords extracted from the machine learning model generated explanation to narrow the items in the list of recommended alcohol items 340.

The pairing module 225 may combine the list of recommended alcohol items 340 with recommendations obtained from a rule-based approach or heuristic-based approach or external data source such as external pairing data 360 to generate the list of final recommended items 350. The pairing module 225 may obtain the alcohol pairing for a food item from the internet or database with external pairing data 360 and do a similar entity linking algorithm as the entity-linking algorithm 330 to map the external alcohol recommendation to items from the catalog of online system 140, and include the items to the list of final recommended products 350. For the users with no alcohol preferences in the order history 320, the pairing module 225 may rely on the top items in the alcohol category based on the user's location as the recommendation.

The pairing module 225 provides a list of final recommended items 350 to the content presentation module 210 for presentation and display along with the associated textual reason for the recommendation. In one or more embodiments, the final subset of recommended items 350 are presented in a carousel user interface (UI) element in association with the anchor item.

Generating Alcohol Pairing Recommendations for Anchor Items

In another one or more embodiments, the pairing module 225 generates alcohol recommendation pairings for an anchor item in conjunction with an LLM and co-occurrence scores. In one or more embodiments, the complementary alcohol items are shown on multiple surfaces of an application of the online system 140, such as an item detail page of an anchor item, post add-to-order on the search page, and a "buy these items again" page that presents a set of items for the user to re-order.

Figure 4:
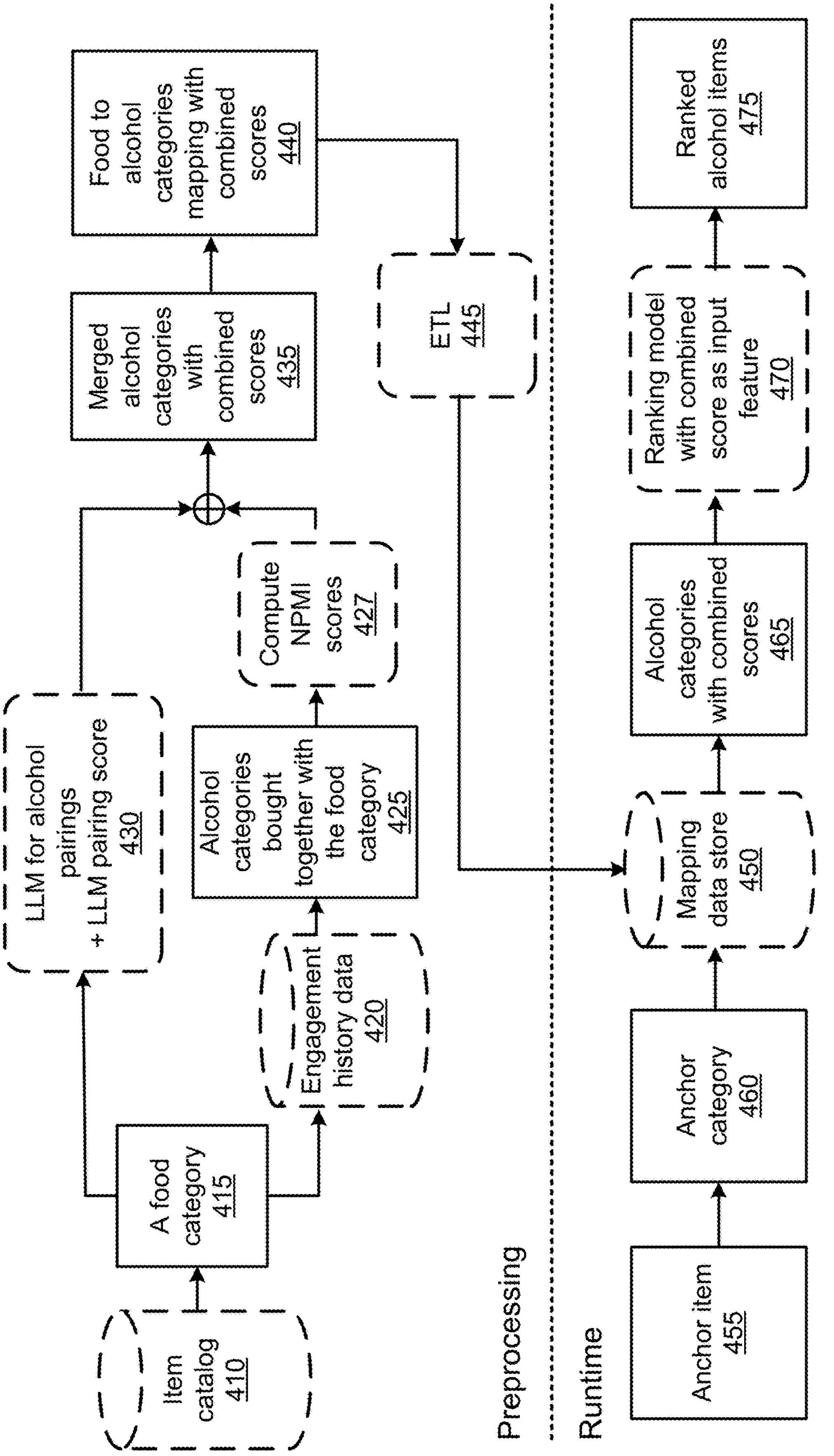
FIG. 4 is a block diagram illustrating an example system for pairing alcohol recommendations to anchor items, in accordance with some embodiments.

FIG. 4 is a block diagram illustrating an example system for pairing alcohol recommendations to anchor items, in accordance with some embodiments. In one or more embodiments, the process of generating alcohol recommendations is performed in two steps: a preprocessing step and a runtime step.

During the preprocessing time, the pairing module 225 obtains access to an item catalog 410. The item catalog 410 includes catalogs of items that are available for order on the online system 140 and the items may be assigned to different categories. For each eligible category 415, the pairing module 225 prompts an LLM which alcohol categories can be paired with the food category 415, and the pairing score for the alcohol category and food category pair. In one or more embodiments, the pairing score may indicate how well an alcohol category is paired with the food category 415 with respect to culinary relevance, complementary taste, and the like. An example prompt may be:

---

Given a food category, recommend alcohol that pairs well with the items in this category. The recommendations can be from wine, spirits, beer or cocktails categories. Try to provide specific types of alcohol, such as Sauvignon Blanc or Malbec, instead of broad alcohol categories like red wine or lager. For each alcohol, also provide a score between 0.00 and 1.00 to indicate how well the food in the given category pairs with this alcohol, and a short reason to explain why you make this recommendation.

Think step-by-step as follows.

1. Think about if any specific type of wine is a good pairing for the give food category. If yes, what are those types of wine.
2. Think about if any specific type of spirits is a good pairing for the give food category. If yes, what are those types of spirits.
3. Think about if any specific type of beer is a good pairing for the give food category. If yes, what are those types of beer.
4. Think about if any specific type of cocktail is a good pairing for the give food category. If yes, what are those types of cocktails.
5. Combine your answers from 1, 2, 3 and 4 as your pairing recommendations. Try to provide as many recommendations as you can (the best 20).

Your final output should match the below format requirements:

- It contains the same number of lines as the alcohol recommendations you provide
- Each line includes the recommended alcohol name, the score you provide, and a reason in the format of [alcohol name], [score], [reason].
- Each line should start with "-" as the bullet.

Here is the food category you need to provide the alcohol recommendations.

--------- food category :

{"steak"}

---

The pairing module 225 obtains alcohol pairings and pairing scores for each alcohol category 430. As an example, for an example food category 415 of steak, the output may indicate two alcohol category pairings, "whiskey" with pairing score=0.6 (higher is more relevant) and "cabernet sauvignon with pairing score=0.9.

The pairing module 225 obtains engagement history data 420. The engagement data 420 includes data on which items were bought together by, for example, previous orders of users. Using the engagement data 420, the pairing module 225 identifies a second set of alcohol categories 425 purchased together with the food category from previous orders, and then computes a co-occurrence score that indicates how often an alcohol category is bought together with the food category. In one instance, the co-occurrence score is computed as a normalized pointwise mutual information (NPMI) score 427. For example, returning to the food category of "steak," the pairing module 225 may determine that alcohol categories frequently bought together are "cabernet sauvignon" with NPMI score=0.8 and "lager" with NPMI score=0.7.

For the food category, the pairing module 225 combines the first set of alcohol categories generated from the LLM with pairing scores and the second set of alcohol categories identified by the co-occurrence scores together to generate a merged list of alcohol categories 435. In one or more embodiments, for each alcohol category on the list, the pairing module 225 computes a combined score by combining the corresponding LLM pairing score and the co-occurrence score for the alcohol category. In one instance, the combination is an average of the two scores. In one instance, if the alcohol category is not associated with the pairing score or co-occurrence score, the score for that alcohol category is set to zero. As an example, for the food category "steak," the merged list of alcohol categories is "whiskey" with a combined score $_{(0.6+0.0)}$/2, "cabernet sauvignon" with a combined score (0.9+0.8)/2, and "lager" with a combined score of (0.0+0.7)/2.

The pairing module 225 generates mappings from each food category to the respective list of alcohol categories and their respective combined scores 440. The pairing module 225 performs one or more extract, transform, load (ETL) operations 445 to store the mapping in mapping data store 450.

During the runtime, the pairing module 225 obtains an anchor food item 455. In one instance, the anchor food item is the main item on an item detail page (e.g., when a user clicks into a particular item to see details) or the item added to a user's order. The pairing module 225 identifies a food category for the anchor item. Using the anchor food category, the pairing module 225 obtains the list of alcohol categories 465 paired to the food category and the combined scores from the mapping data store 450. The pairing module 225 identifies a set of candidate alcohol items that are assigned to each alcohol category. In one instance, the candidate alcohol items are identified based on availability, relevancy, or personalization checks. The pairing module 225 accesses a ranking model 470. The pairing module 225 applies parameters of the ranking model to a set of features of an alcohol item and anchor item to generate a likelihood (e.g., click-through rate (CTR)) a user will interact with the alcohol item if displayed in pair with the anchor item. The pairing module 225 ranks 475 the alcohol items according to the predicted likelihoods and selects a subset of alcohol items for presentation to the user.

In one or more embodiments, the ranking model is coupled to receive a set of features relating to an anchor item and an alcohol item, and generate an estimated likelihood (e.g., CTR) that indicates a likelihood the user will interact with this alcohol item if, for example, the alcohol item was presented in a pairing counsel on an user interface generated on a client device of a user. In one instance, the set of features include features related to the anchor item, such as the category of the anchor item, the previous engagement history of the user with the anchor item. In one instance, the set of features include features related to the alcohol item, such as the category of the alcohol item, the previous engagement history of the user with the alcohol item. In one instance, the set of features include joint features between the anchor item and the alcohol item, such as the number of orders where the alcohol item and the anchor item were purchased together by the user or for other orders and the combined score determined for the pair (e.g., element 470 in FIG. 4). The trained parameters of the ranking model may be applied to the set of features for a pair of anchor item and alcohol item to generate the CTR for the pair.

The pairing module 225 ranks the list of anchor item and candidate alcohol item pairs based on the estimated likelihood generated by applying the ranking model on the pairs. In one instance, the ranking is obtained by computing a product between the estimated likelihood and average advertisement revenue per click. The pairing module 225 may select a subset of candidate alcohol items that have the highest expected revenue and display the subset of selected alcohol items in a pairing carousel on a page displaying the anchor item.

Figure 5:
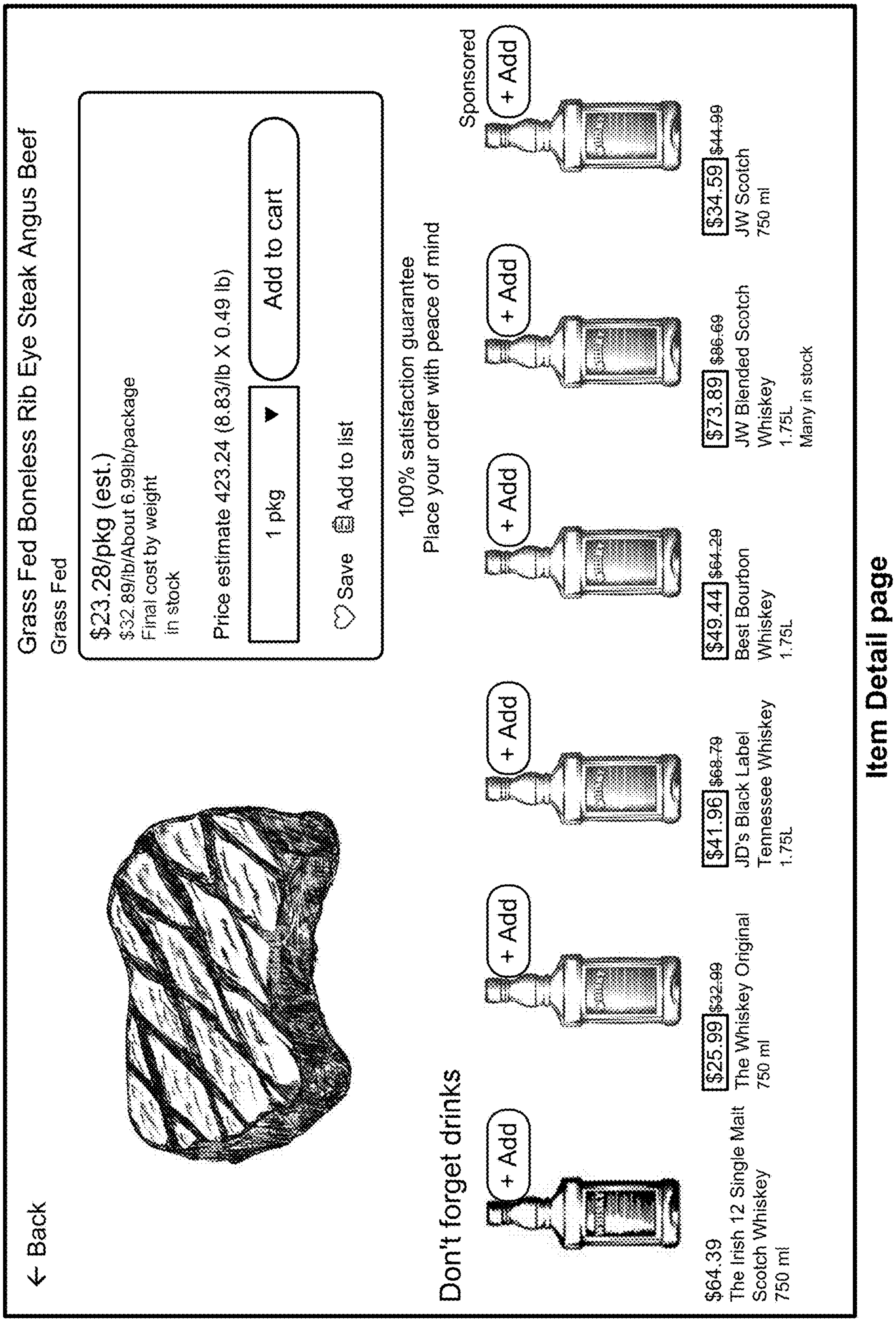
FIG. 5 illustrates an example screenshot of surfacing alcohol recommendations to a user of the online system, in accordance with some embodiments.

FIG. 5 illustrates an example screenshot of an item description page and pairing counsel generated for the anchor item, in accordance with one or more embodiments. In the example shown in FIG. 5, the user may interact with an anchor item of "Grass Fed Boneless Rib Eye Steak Angus Beef" and the item description page may be displayed on a client device of the user. The anchor item is mapped to an anchor category of "steaks." The pairing module 225 obtains mappings for the anchor category and a set of alcohol categories that have a combined score above a threshold. As an example, an alcohol category may be "scotch whiskey." The pairing module 225 obtains a set of candidate whiskey items from the catalog. The pairing module 225 obtains a set of features related to the anchor item, the candidate whiskey items, and joint features that relate to both the anchor item and the candidate alcohol items. The pairing module 225 selects a subset of whiskey items based on the estimated CTR generated from the ranking model and provides the selected items for display in a pairing carousel on the item description page, as shown in the bottom carousel of FIG. 5.

The machine learning training module 230 trains machine learning models used by the online system 140. For example, the machine learning module 230 may train the item selection model, the availability model, or any of the machine-learned models deployed by the model serving system 150. The online system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters that the machine learning model uses to process an input. As an example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. As an example, each training example may include customer data, picker data, item data, or order data. In some cases, the training examples include a label which represents an expected output of the machine learning model. In these cases, the machine learning model is trained by comparing its output from input data of a training example to the label for the training example.

The machine learning training module 230 applies an iterative process to train a machine learning model, where the machine learning training module 230 trains the model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model so that the score is higher when the machine learning model performs poorly and lower when the machine learning model performs well. In the cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. As an example, the machine learning training module 230 may apply gradient descent to update the set of parameters.

In one or more embodiments, the machine learning training module 230 trains the ranking model described in conjunction with the pairing module 225. The training dataset for training the ranking model includes a plurality of training examples, where an example includes a set of features extracted from a pair of anchor items and an alcohol pair and a corresponding label on whether the user interacted with the alcohol item in conjunction with the anchor item. During the training process, the machine learning training module 230 trains parameters of the ranking model by applying the ranking model to the set of features to generate estimated outputs. The loss function is calculated indicating a difference between the estimated outputs and the labels. The parameters updated to backpropagate terms obtained from the loss function.

The data store 240 stores data used by the online system 140. For example, the data store 240 stores user data, item data, order data, and picker data for use by the online system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online system 140. In another embodiment, when the model serving system 150 is included in the online system 140, the machine-learning training module 230 may further train parameters of the machine-learned model based on data specific to the online system 140 stored in the data store 240. For example, the machine-learning training module 230 may obtain a pre-trained transformer language model and further fine tune the parameters of the transformer model using training data stored in the data store 240. The machine-learning training module 230 may provide the model to the model serving system 150 for deployment.

Figure 6:
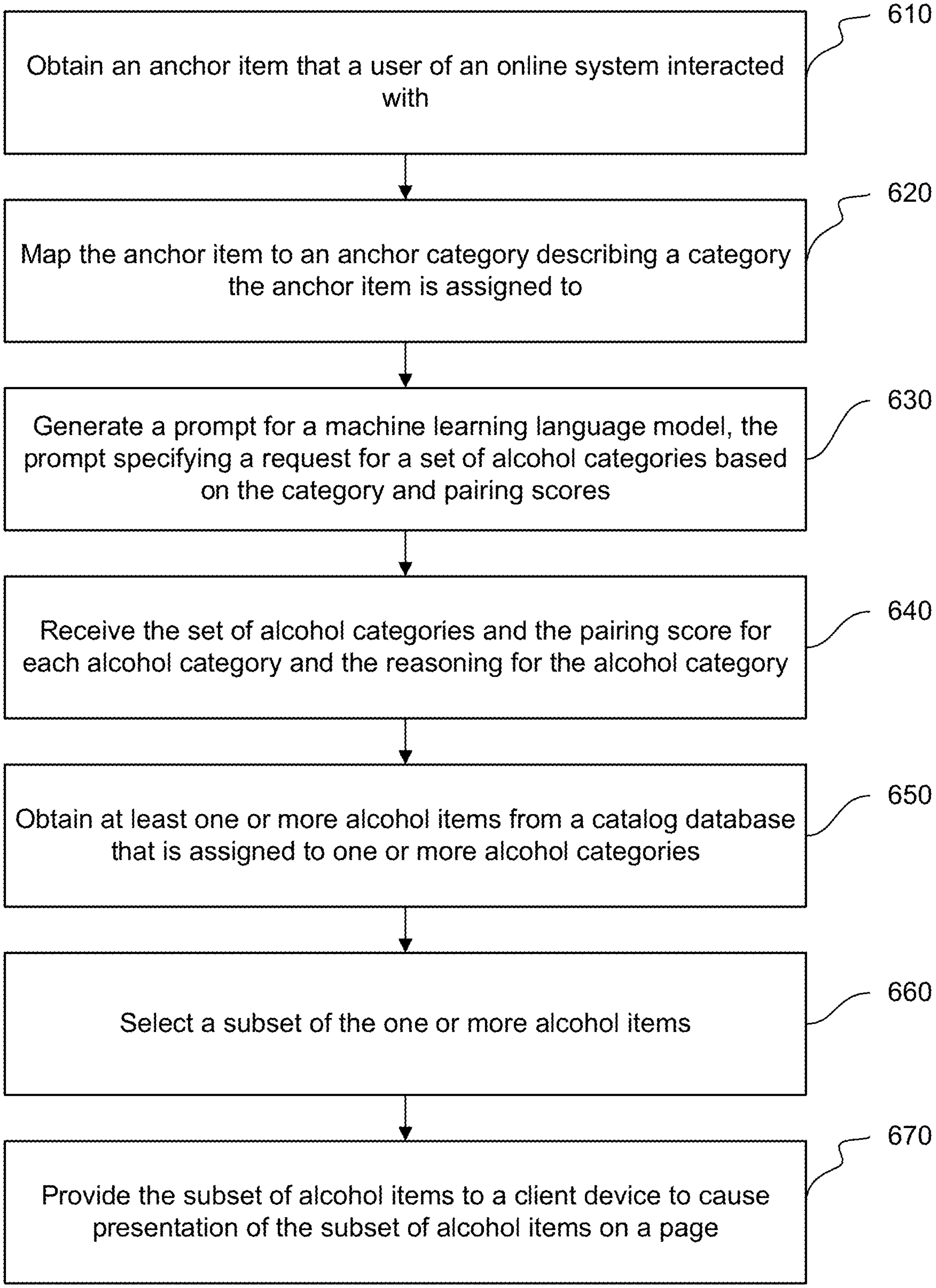
FIG. 6 is a flowchart for personalizing alcohol recommendations, in accordance with some embodiments.

FIG. 6 is a flowchart for an example method of personalizing alcohol recommendations, in accordance with some embodiments. Alternative embodiments may include more, fewer, or different steps from those illustrated in FIG. 6 and the steps may be performed in a different order from that illustrated in FIG. 6. These steps may be performed by an online system (e.g., online system 140). Additionally, each of these steps may be performed automatically by the online concierge system without human intervention.

The online system 140 obtains 610 an anchor item that a user of an online system interacted with. The online system 140 maps 620 the anchor item to an anchor category describing a category the anchor item is assigned to. The online system 140 generates 630 a prompt for a machine learning language model. In one or more embodiments, the prompt specifies a request for a set of alcohol categories based on the anchor category and for each alcohol category, a respective pairing score indicating a degree of relevance between the anchor category and the alcohol category and a reasoning for the pairing of the alcohol category. The online system 140 receives 640, as an output from the machine learning language model, the set of candidate alcohol categories and the pairing score for each alcohol category and the reasoning for the alcohol category. The online system 140 obtains 650 at least one or more alcohol items from a catalog database that is assigned to one or more alcohol categories in the set of alcohol categories. The online system 140 selects 660 a subset of the one or more alcohol items. The online system 140 provides 670 the subset of alcohol items to a client device of the user to cause presentation of the subset of alcohol items on a page generated on the client device.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:

during preprocessing, obtaining an anchor item that a user of an online system interacted with;

mapping the anchor item to an anchor category describing a category the anchor item is assigned to;

generating a prompt for a machine learning language model, the prompt specifying a request for a set of beverage categories based on the anchor category and for each beverage category, a respective pairing score indicating a degree of relevance between the anchor category and the beverage category and a reasoning for the pairing of the beverage category;

receiving, as an output from the machine learning language model, the set of beverage categories, the pairing score for each beverage category, and the reasoning for the beverage category, wherein the machine learning language model is configured as a transformer architecture including one or more attention layers;

obtaining a second set of beverage categories based on engagement history data, the engagement history data describing previous orders submitted to the online system;

for each beverage category in the second set, computing a respective co-occurrence score for the beverage category indicating a frequency items in the beverage category were purchased together with items in the anchor category;

for each beverage category in a merged list that merges the set and the second set of beverage categories, computing a combined score by combining the pairing score and the co-occurrence score for the beverage category;

storing a mapping from the anchor category, the merged list of beverage categories, and the combined scores in a datastore;

during runtime, obtaining one or more beverage items from a catalog database that is assigned to one or more beverage categories in the set of beverage categories;

for each beverage item in the one or more beverage items, obtaining a set of features for the beverage item and the anchor item, wherein the set of features include at least the combined score for each beverage category that is retrieved from the mapping database;

for each beverage item, applying a machine-learning ranking model to the set of features to generate a likelihood for the beverage item indicating whether the user will interact with the beverage item in association with the anchor item;

selecting a subset of the one or more beverage items;

wherein the selected subset of beverage items are associated with likelihoods above a predetermined threshold;

providing the subset of beverage items to a client device of the user to cause presentation of the subset of beverage items on a page generated on the client device;

obtaining feedback from the user indicating whether the user interacted with the subset of beverage items;

responsive to receiving indication that the user interacted with the subset of beverage items, creating a training dataset including the anchor category and beverage categories of the subset of beverage items; and fine-tuning parameters of the machine-learning language model using the training dataset.

2. The method of claim 1, wherein obtaining the one or more beverage items further comprises:

accessing the catalog database storing a hierarchy of entities;

matching the one or more beverage categories to corresponding entities in the catalog database; and identifying the one or more beverage items that are assigned to the matched entities in the catalog database.

3. The method of claim 1, further comprising:

obtaining beverage preferences of the user extracted from an order history of the user, wherein the prompt further specifies the beverage preferences of the user and for each beverage category, a request for a respective preference score indicating a degree of preference of the user for the beverage category.

4. The method of claim 1, wherein obtaining the one or more beverage items further comprises:

identifying the one or more beverage categories that are associated with combined scores above a predetermined threshold.

5. The method of claim 1, wherein the page is one or a combination of a description page of the anchor item or an order page of the user.

6. The method of claim 1, wherein the selected subset of beverage items is presented in a carousel user interface (UI) element on the page generated on the client device.

7. A non-transitory computer-readable storage medium storing instructions that, when executed by a computer processor system, cause the computer processor system to perform operations comprising:

during preprocessing, obtaining an anchor item that a user of an online system interacted with;

mapping the anchor item to an anchor category describing a category the anchor item is assigned to;

generating a prompt for a machine learning language model, the prompt specifying a request for a set of beverage categories based on the anchor category and for each beverage category, a respective pairing score indicating a degree of relevance between the anchor category and the beverage category and a reasoning for the pairing of the beverage category;

receiving, as an output from the machine learning language model, the set of beverage categories, the pairing score for each beverage category, and the reasoning for the beverage category, wherein the machine learning language model is configured as a transformer architecture including one or more attention layers;

obtaining a second set of beverage categories based on engagement history data, the engagement history data describing previous orders submitted to the online system;

for each beverage category in the second set, computing a respective co-occurrence score for the beverage category indicating a frequency items in the beverage category were purchased together with items in the anchor category;

for each beverage category in a merged list that merges the set and the second set of beverage categories, computing a combined score by combining the pairing score and the co-occurrence score for the beverage category;

storing a mapping from the anchor category, the merged list of beverage categories, and the combined scores in a datastore;

during runtime, obtaining one or more beverage items from a catalog database that is assigned to one or more beverage categories in the set of beverage categories;

for each beverage item in the one or more beverage items, obtaining a set of features for the beverage item and the anchor item, wherein the set of features include at least the combined score for each beverage category that is retrieved from the mapping database;

for each beverage item, applying a machine-learning ranking model to the set of features to generate a likelihood for the beverage item indicating whether the user will interact with the beverage item in association with the anchor item;

selecting a subset of the one or more beverage items;

wherein the selected subset of beverage items are associated with likelihoods above a predetermined threshold;

providing the subset of beverage items to a client device of the user to cause presentation of the subset of beverage items on a page generated on the client device;

obtaining feedback from the user indicating whether the user interacted with the subset of beverage items;

responsive to receiving indication that the user interacted with the subset of beverage items, creating a training dataset including the anchor category and beverage categories of the subset of beverage items; and fine-tuning parameters of the machine-learning language model using the training dataset.

8. The non-transitory computer-readable storage medium of claim 7, wherein obtaining the one or more beverage items further comprise:

accessing the catalog database storing a hierarchy of entities;

matching the one or more beverage categories to corresponding entities in the catalog database; and determining the one or more beverage items that are assigned to the matched entities in the catalog database.

9. The non-transitory computer-readable storage medium of claim 7, the operations further comprising:

obtaining beverage preferences of the user extracted from an order history of the user, wherein the prompt further specifies the beverage preferences of the user and for each beverage category, a request for a respective preference score indicating a degree of preference of the user for the beverage category.

10. The non-transitory computer-readable storage medium of claim 7, wherein obtaining the one or more beverage items further comprises:

determining the one or more beverage categories that are associated with combined scores above a predetermined threshold.

11. The non-transitory computer-readable storage medium of claim 7, wherein the page is one or a combination of a description page of the anchor item or an order page of the user.

12. The non-transitory computer-readable storage medium of claim 7, wherein the selected subset of beverage items is presented in a carousel user interface (UI) element on the page generated on the client device.

13. A computer system, comprising:

a computer processor system; and a non-transitory computer-readable storage medium storing instructions that, when executed by a computer processor system, cause the computer processor system to perform operations comprising:

during preprocessing, obtaining an anchor item that a user of an online system interacted with;

mapping the anchor item to an anchor category describing a category the anchor item is assigned to;

generating a prompt for a machine learning language model, the prompt specifying a request for a set of beverage categories based on the anchor category and for each beverage category, a respective pairing score indicating a degree of relevance between the anchor category and the beverage category and a reasoning for the pairing of the beverage category;

receiving, as an output from the machine learning language model, the set of beverage categories, the pairing score for each beverage category, and the reasoning for the beverage category, wherein the machine learning language model is configured as a transformer architecture including one or more attention layers;

obtaining a second set of beverage categories based on engagement history data, the engagement history data describing previous orders submitted to the online system;

for each beverage category in the second set, computing a respective co-occurrence score for the beverage category indicating a frequency items in the beverage category were purchased together with items in the anchor category;

for each beverage category in a merged list that merges the set and the second set of beverage categories, computing a combined score by combining the pairing score and the co-occurrence score for the beverage category;

storing a mapping from the anchor category, the merged list of beverage categories, and the combined scores in a datastore;

during runtime, obtaining one or more beverage items from a catalog database that is assigned to one or more beverage categories in the set of beverage categories;

for each beverage item in the one or more beverage items, obtaining a set of features for the beverage item and the anchor item, wherein the set of features include at least the combined score for each beverage category that is retrieved from the mapping database;

for each beverage item, applying a machine-learning ranking model to the set of features to generate a likelihood for the beverage item indicating whether the user will interact with the beverage item in association with the anchor item;

selecting a subset of the one or more beverage items;

wherein the selected subset of beverage items are associated with likelihoods above a predetermined threshold;

providing the subset of beverage items to a client device of the user to cause presentation of the subset of beverage items on a page generated on the client device;

obtaining feedback from the user indicating whether the user interacted with the subset of beverage items;

responsive to receiving indication that the user interacted with the subset of beverage items, creating a training dataset including the anchor category and beverage categories of the subset of beverage items; and fine-tuning parameters of the machine-learning language model using the training dataset.

* * * * *